United States Patent
Valva et al.

(10) Patent No.: US 10,400,883 B2
(45) Date of Patent: Sep. 3, 2019

(54) GEAR WITH FLUID CONTROL DAM AND APERTURES

(71) Applicant: United Technologies Corporation, Farmington, CT (US)

(72) Inventors: Christopher M. Valva, Manchester, CT (US); Christopher T. Anglin, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 284 days.

(21) Appl. No.: 15/398,373

(22) Filed: Jan. 4, 2017

(65) Prior Publication Data

US 2018/0187769 A1 Jul. 5, 2018

(51) Int. Cl.
*F16H 1/14* (2006.01)
*F16H 55/17* (2006.01)
*F16H 57/04* (2010.01)
*F02C 7/36* (2006.01)

(52) U.S. Cl.
CPC ............ *F16H 57/043* (2013.01); *F02C 7/36* (2013.01); *F16H 1/14* (2013.01); *F16H 55/17* (2013.01); *F16H 57/0427* (2013.01); *F16H 57/0495* (2013.01); *F05D 2260/4031* (2013.01); *F05D 2260/98* (2013.01)

(58) Field of Classification Search
CPC ............ F16H 57/0409; F16H 57/042; F16H 57/0421; F16H 57/0423; F16H 57/0424; F16H 57/0426; F16H 57/0427; F16H 57/043; F16H 57/0493
USPC .................................................. 74/423, 467
See application file for complete search history.

(56) References Cited

U.S. PATENT DOCUMENTS

| 2,681,126 A | 6/1954 | Searls |
| 3,912,418 A | 10/1975 | Andrews |
| 4,222,283 A | 9/1980 | Nagy |
| 4,667,774 A | 5/1987 | Roberge |
| 5,189,929 A | 3/1993 | Chory |
| 5,601,508 A | 2/1997 | Kuzevanov |
| 8,056,662 B2 | 11/2011 | Schoon |
| 8,893,469 B2 | 11/2014 | DiBenedetto |
| 8,939,862 B2 | 1/2015 | Janson |
| 2006/0035741 A1 | 2/2006 | Mierisch |

(Continued)

FOREIGN PATENT DOCUMENTS

DE 1911612 9/1970

OTHER PUBLICATIONS

EP search report for EP18150360.8 dated Apr. 19, 2018.

*Primary Examiner* — William Kelleher
*Assistant Examiner* — T. Scott Fix
(74) *Attorney, Agent, or Firm* — O'Shea Getz P.C.

(57) ABSTRACT

Aspects of the disclosure are directed to a gear comprising: gear teeth, a cone wall having an interior surface that forms a chamber, where the gear teeth extend circumferentially from a distal end of the cone wall, a dam that extends radially inward on the interior surface and is axially disposed between the cone wall and the gear teeth, and at least one aperture formed in the cone wall to allow fluid on the interior surface to exit the chamber, where the at least one aperture is located a first distance from the gear teeth along a length of the gear and the dam is located a second distance from the gear teeth along the length of the gear, and where the first distance is greater than the second distance.

15 Claims, 5 Drawing Sheets

(56) References Cited

U.S. PATENT DOCUMENTS

| | | | |
|---|---|---|---|
| 2006/0053922 A1* | 3/2006 | Laabs | F16H 57/0431 |
| | | | 74/467 |
| 2007/0175706 A1 | 8/2007 | Shilo et al. | |
| 2007/0295557 A1* | 12/2007 | Aldridge | F16C 33/6651 |
| | | | 184/13.1 |
| 2009/0093328 A1* | 4/2009 | Dickinger | F16H 55/171 |
| | | | 474/152 |
| 2010/0140019 A1* | 6/2010 | Imai | F16H 57/0493 |
| | | | 184/6.12 |
| 2011/0108360 A1 | 5/2011 | DiBenedetto | |
| 2013/0025405 A1* | 1/2013 | Arisawa | F01D 25/18 |
| | | | 74/606 R |
| 2014/0255162 A1 | 9/2014 | DiBenedetto | |
| 2015/0097073 A1* | 4/2015 | McPeak | B64C 27/12 |
| | | | 244/17.11 |
| 2015/0233464 A1* | 8/2015 | Wiens | F16C 33/6666 |
| | | | 184/6.12 |
| 2016/0123149 A1* | 5/2016 | Kishi | F16H 57/029 |
| | | | 415/122.1 |
| 2016/0200413 A1 | 7/2016 | McDonald | |
| 2016/0230875 A1* | 8/2016 | Pankratov | F16H 57/0409 |
| 2017/0051823 A1* | 2/2017 | Pikovsky | F02C 7/06 |
| 2017/0146112 A1* | 5/2017 | Anglin | F02C 7/32 |

* cited by examiner

GEAR WITH FLUID CONTROL DAM AND APERTURES

BACKGROUND

Figure 2A:
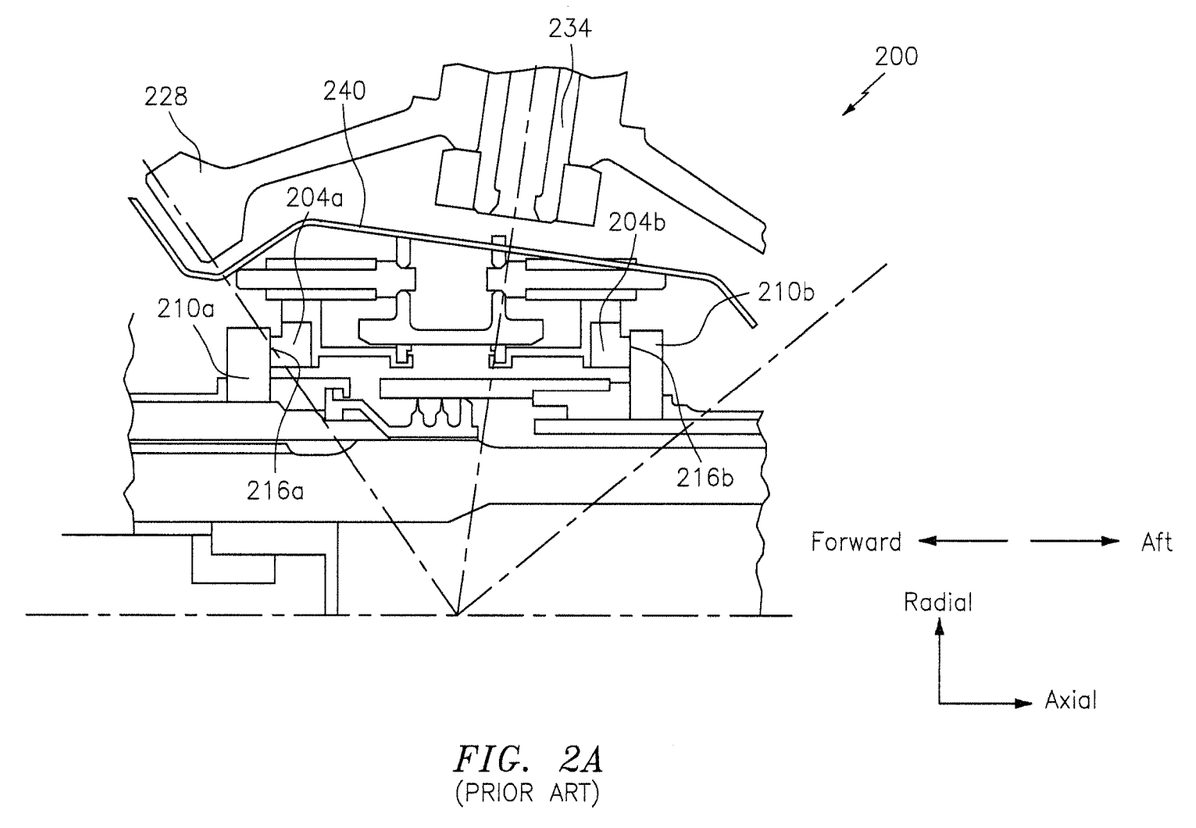
FIG. 2A illustrates a bearing compartment in accordance with the prior art.

Gas turbine engines, such as those which power aircraft and industrial equipment, employ a compressor to compress air that is drawn into the engine and a turbine to capture energy associated with the combustion of a fuel-air mixture. The engine includes a bearing compartment that houses bearings, where the bearings support hardware of the engine. FIG. 2A illustrates a bearing compartment 200 in accordance with the prior art. Stationary carbon segments 204a and 204b interface with respective seal runners 210a and 210b (the seal runners are sometimes referred to as seal plates or seal seats in the art), where the seal runners 210a and 210b rotate when the engine is operated. An interface 216a/216b between a carbon segment 204a/204b and a seal runner 210a/210b may be prone to heating when the engine is operated, such that oil may be provided via one or more holes (not shown) formed in the seal runner 210a/210b in order to cool the seal runner 210a/210b. In some instances, oil is sprayed directly onto the rotating seal runner 210a/210b.

As the engine is operated, the seal runners 210a and 210b eject at least some of the oil in a radially outward/outboard direction. In an effort to shield a bevel gear 228 and associated towershaft 234 that are located radially outward of the seal runners 210a and 210b from the oil, a baffle 240 is included.

Figure 2B:
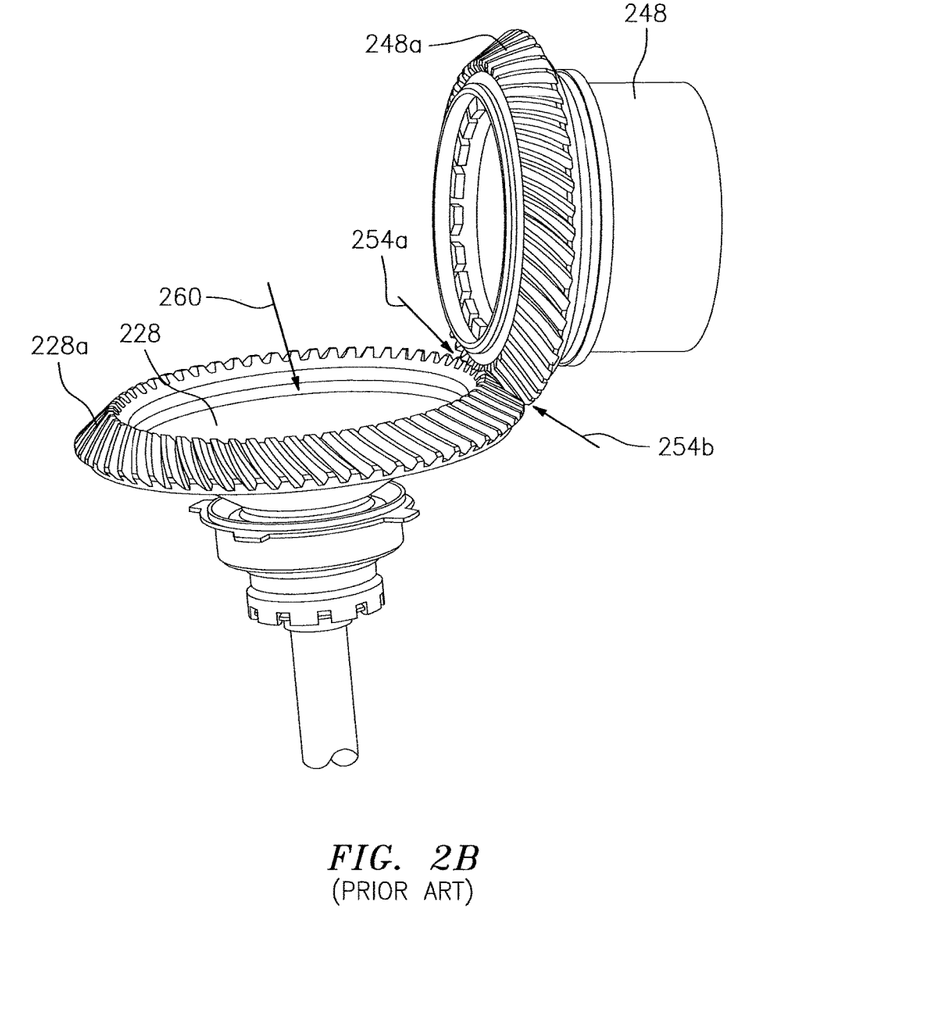
FIG. 2B illustrates a bevel gear in relationship to a bull gear in accordance with the prior art.

Referring to FIG. 2B, a closer view of the bevel gear 228/towershaft 234 of FIG. 2A is shown. In particular, in FIG. 2B the bevel gear 228 is shown in positional relationship relative to a bull gear 248, where the bull gear 248 may represent a second instance of a bevel gear. Oil is purposefully/intentionally applied to the gears 228 and 248 to lubricate the gears; the arrow 254a represents the use of an into-mesh oiling technique and the arrow 254b represents the use of an out-of-mesh oiling technique as would be known to one of skill in the art. The arrow 260 represents an impingement of oil onto, e.g., the bevel gear 228.

The impingement of the oil onto the gears 228 and 248 is due to the motion of rotating components (e.g., the rotation of the seal runners 210a and 210b of FIG. 2A as described above). The impingement of oil onto a cone wall (e.g., cone wall 228b—see FIG. 2C) of a gear (e.g., gear 228), or any entrainment of oil into gear teeth (e.g., gear teeth 228a and 248a, where the oil then passes into the gear mesh between locations highlighted by 254a and 254b in FIG. 2B), consumes some of the power that would otherwise be utilized as engine output. Additionally, heat is added unnecessarily to the oil because of this power loss/efficiency reduction. This additional heat needs to be removed via a heat exchanger, further reducing engine efficiency. As the oil is eventually expelled from the cone wall and/or the gear teeth of the gear, the oil will tend to be expelled in an uncontrolled manner (e.g., in an uncontrolled direction). This expelled oil will then contact other (rotating) components, further increasing the heat that is generated.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a gear comprising: gear teeth, a cone wall having an interior surface that forms a chamber, where the gear teeth extend circumferentially from a distal end of the cone wall, a dam that extends radially inward on the interior surface and is axially disposed between the cone wall and the gear teeth, and at least one aperture formed in the cone wall to allow fluid on the interior surface to exit the chamber, where the at least one aperture is located a first distance from the gear teeth along a length of the gear and the dam is located a second distance from the gear teeth along the length of the gear, and where the first distance is greater than the second distance. In some embodiments, the dam is a full hoop structure. In some embodiments, at least one of the cone wall or the dam is made of a metal or a metal alloy. In some embodiments, the gear is one of a bevel gear, a bull gear, or a spur gear.

Aspects of the disclosure are directed to an engine comprising: a bull gear that includes first gear teeth, and a bevel gear that includes second gear teeth coupled to the first gear teeth, the bevel gear including: a cone wall having an interior surface that forms a chamber, where the second gear teeth extend circumferentially from a distal end of the cone wall, a dam that extends radially inward on the interior surface and is axially disposed between the cone wall and the second gear teeth, and at least one aperture foliated in the cone wall to allow fluid on the interior surface to exit the chamber, where the at least one aperture is located a first distance from the second gear teeth along a length of the bevel gear and the dam is located a second distance from the second gear teeth along the length of the bevel gear, and where the first distance is greater than the second distance. In some embodiments, the at least one aperture conveys a fluid that impinges upon the cone wall subsequent to the fluid contacting the dam. In some embodiments, the fluid includes oil. In some embodiments, the engine further comprises a baffle that redirects the fluid that exits the at least one aperture in a predetermined direction. In some embodiments, the predetermined direction is based on at least one of an orientation of the at least one aperture or an orientation of the baffle. In some embodiments, the engine further comprises at least one conduit that captures the fluid that exits the at least one aperture. In some embodiments, the at least one conduit routes the fluid to at least one of a tank, a sump, or a scavenge line. In some embodiments, the at least one aperture includes a plurality of apertures formed in the cone wall. In some embodiments, the dam is a full hoop structure.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure are directed to apparatuses, systems, and methods associated with an engine. In some embodiments, a gear train of the engine may include one or more gears. A gear may include a dam that may substantially prevent oil that impinges upon a web/cone wall of the gear from entering gear teeth of the gear. Upon contacting the dam, the oil may be directed to one or more apertures located around at least a portion of a circumference of the gear. The oil may exit the gear at the apertures. The oil that exits the apertures may be directed away from other components and/or collected/captured for use elsewhere.

Figure 1:
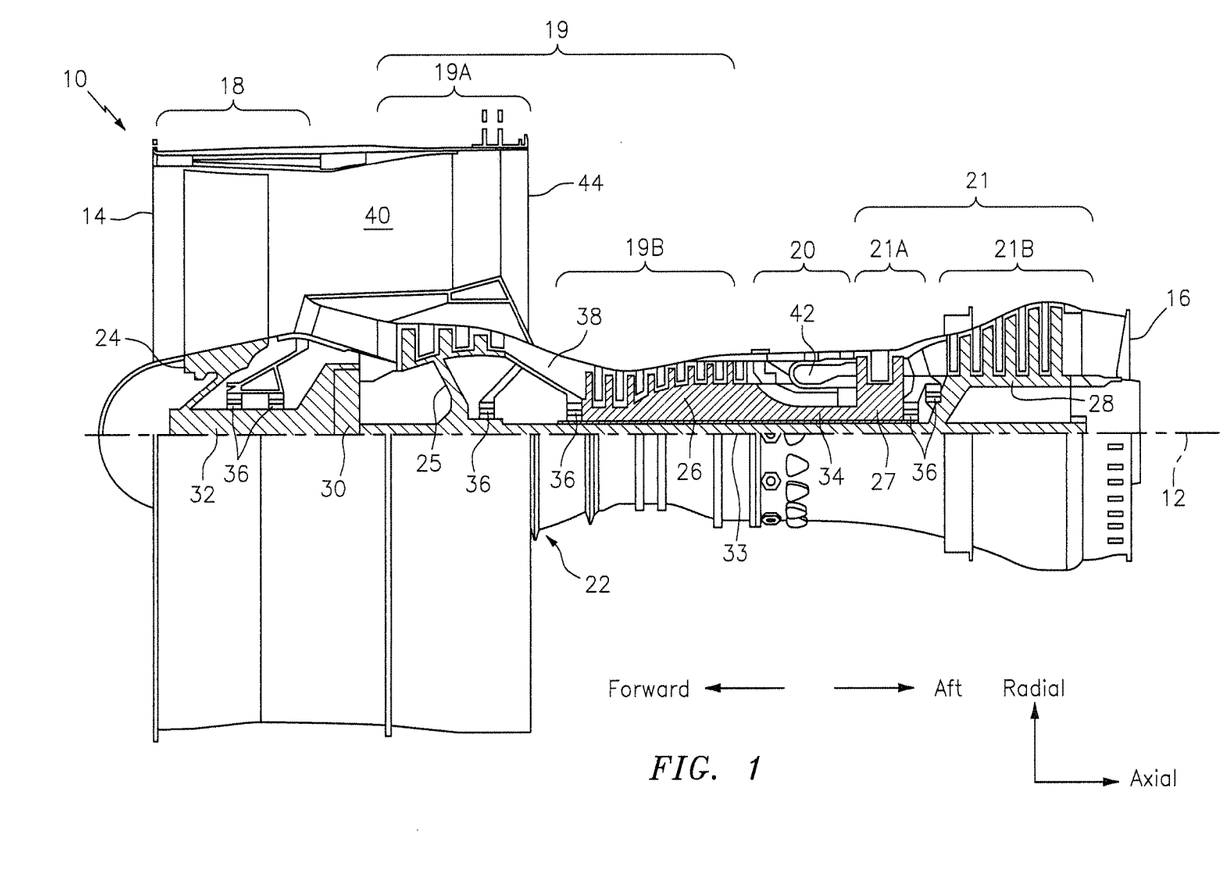
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2C:
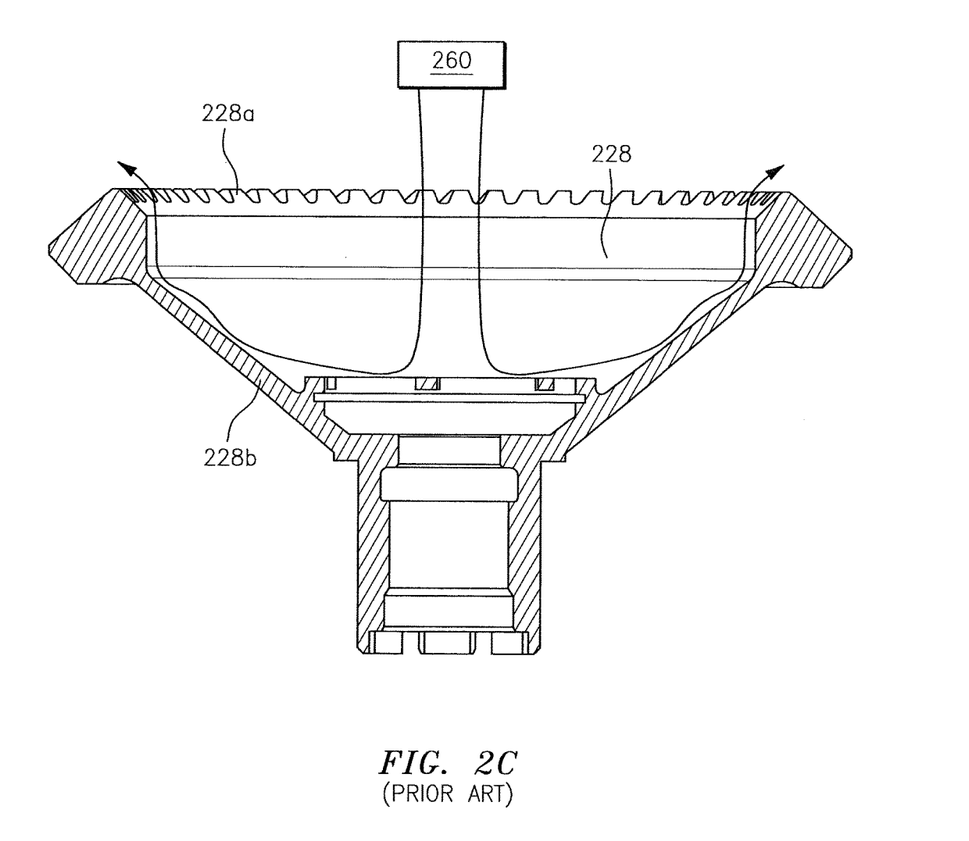
FIG. 2C illustrates an impingement of oil about a bevel gear in accordance with the prior art.
Figure 3:
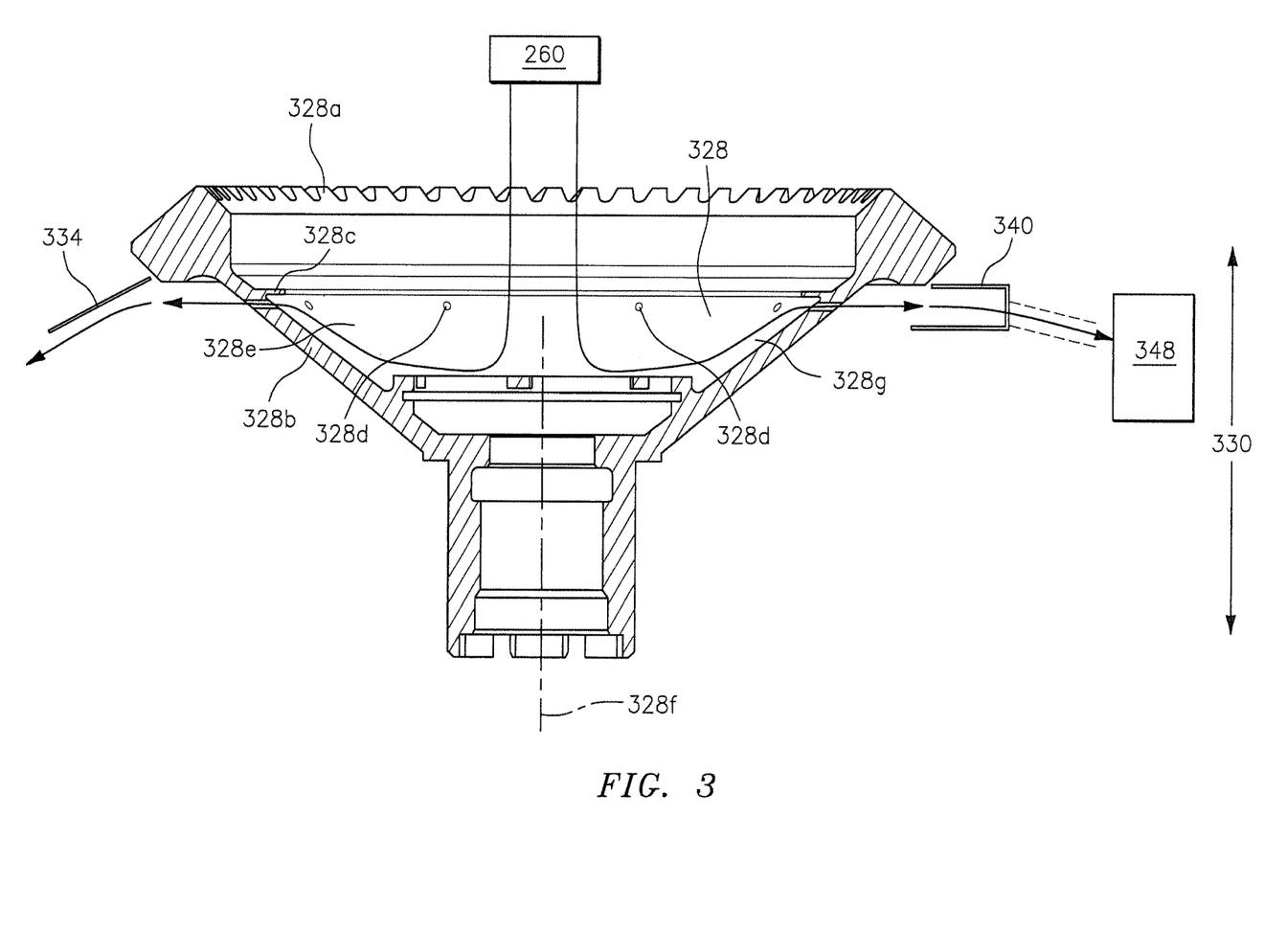
FIG. 3 illustrates a bevel gear incorporating a dam and at least one cooperatively adjacent aperture in accordance with aspects of this disclosure. (The dam and the holes can exist without the adjacent oil directing components 334 or oil collecting components 340. The oil would just be slung off into the compartment from the rotating gear. I would consider this to be the base configuration. Adding the baffle 334 or collecting feature 340 would be an additional concept.

Referring now to FIG. 3, a bevel gear 328 in accordance with aspects of this disclosure is shown. The gear 328 may include an arrangement of gear teeth 328a and a cone wall 328b. In some embodiments, the gear teeth 328a and cone wall 328b may correspond to the gear teeth 228a and cone wall 228b of FIGS. 2A-2C, which is to say that a form factor/profile of the gear 328 may substantially coincide with a form factor/profile of the gear 228 of FIGS. 2A-2C. In this respect, the gear 328 may serve as a drop-in replacement/substitute for the gear 228 of FIGS. 2A-2C, such that the gear 328 may be used to retrofit legacy platforms/engine architectures.

The gear 328 may include a dam 328c. The dam 328c may be made of the same material as, e.g., the cone wall 328b of the gear 328 or may be made of a different material. For example, the cone wall 328b and/or the dam 328c may be made of one or more metals or metal alloys. The dam 328c may be located at a given position along a length/span 330 of the gear 328. The dam 328c may be disposed between the cone wall 328b and the gear teeth 328a. The dam 328c may be a full hoop/ring structure that provides a lip that coincides with an interior circumference/perimeter of the gear 328. The dam/lip 328c may be sized to interrupt the axial component of the flow of oil from a chamber 328e formed on an interior surface 328g of the cone wall 328b. It is contemplated that the dam/lip 328c may include a plurality of discrete cooperating structures, rather than a full hoop/ring structure, to disrupt the flow of oil axially out of the chamber 328e and redirect the oil to flow radially outward via one or more holes/apertures as described below.

The gear 328 may include one or more holes/apertures 328d. The apertures 328d may be formed in the cone wall 328b and extend radially outward relative to a longitudinal axis 328f of the gear 328 (where the longitudinal axis 328f is oriented in the same direction as the length/span 330). A position of the apertures 328d may substantially coincide with the position of the dam 328c as shown in FIG. 3 in terms of location along the length/span 330 of the gear 328. The apertures 328d may be located a first distance from the gear teeth 328a and the dam 328c may be located a second distance from the gear teeth 328a. The first distance may be different from (e.g., greater than) the second distance. In one embodiment, the dam 328c is located axially adjacent to the one or more holes/apertures 328d, and the dam 328c is axially distal with respect to the one or more holes/apertures 328d.

In operation, oil 260 that impinges upon the web/cone wall 328b of the gear 328 may travel along (e.g., up) the cone wall 328b in a direction towards the gear teeth 328a until the oil contacts the dam 328c. Upon contacting the dam 328c, the oil may be centrifuged outward through the apertures 328d. In this manner, the oil may be substantially precluded from entering the gear teeth 328a, thus improving oil management.

Relative to the gear 228 of FIGS. 2A-2C, the oil may exit the gear 328 of FIG. 3 in a more uniform manner (e.g., in a more uniform direction) as the location of the holes 328d will be established in advance. In this respect, relative to the gear 228 of FIGS. 2A-2C, it may be easier to redirect the oil exiting the gear 328/apertures 328d of FIG. 3 away from other components and/or capture the oil for use elsewhere.

FIG. 3 illustrates two techniques that may be used for processing the oil as it exits the apertures 328d. Reference character 334 pertains to a baffle that may be used to redirect the oil exiting the apertures 328d in a given/predetermined direction, based on an orientation of the apertures 328d and/or an orientation of the baffle 334. Reference character 340 pertains to a conduit/channel that may be used to capture and route the oil exiting the apertures 328d to a given/predetermined location 348 (e.g., a sump, a scavenge line, a tank, etc.). (The oil collection system 340 is fixed to ground, while the gear 328 is rotating. Oil will depart through the holes in the gear 328d, forming a disc of oil in space surrounding the gear, as it sheds off of the rotating gear. The conduit 340 would essentially be constructed as an open annulus that would receive this oil disc regardless of the position in the arc of rotation where it leaves the gear. While there might be a similar or identical number of conduits 340 to the number of holes in the gear 328d, because the gear is rotating relative to the conduit, we wouldn't necessarily match them up in sets.

A particular parameter (e.g., dimension, material, etc.) that is used for the dam 328c may be selected based a finite element analysis. Such an analysis may be used to ensure that the structural integrity of the gear 328/dam 328c is sufficient to meet one or more application requirements/environmental conditions. A fluid flow analysis may be performed to determine one or more parameters (e.g., location, count, dimension) for the apertures 328d. The fluid flow analysis may be based on the amount/volume of oil 260 that is expected to impinge upon the gear 328.

Technical effects and benefits of this disclosure include an ability to reduce/minimize an amount/volume of oil that enters gear teeth of a gear, such as for example oil that originates as impingement oil upon the gear. In this manner, the amount of heat that is generated may be reduced/minimized, thereby reducing/minimizing the amount of heat sinks (or, analogously, heat sink capacity) that may be required. Furthermore, the reduction in oil that enters the gear teeth may help to increase/maximize engine output power/efficiency.

While some of the examples described herein relate to providing oil to a gear, aspects of the disclosure may be used to provide any type of fluid (e.g., any type of liquid) to the gear. Examples of such fluids may include hydraulic fluid, fuel (e.g., gasoline), refrigerant, etc.

While some of the examples described herein relate to bevel and bull gears, aspects of the disclosure may be applied in connection with other types of gears, such as for example a spur gear.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A gear comprising:
   gear teeth;
   a cone wall disposed about an axis and comprising a first end and a second end opposite the first end, the cone wall further comprising an interior surface extending between the first and second ends, a radial distance between the interior surface and the axis increasing from the first end to the second end, the radial distance between the axis and the interior surface of the cone wall defining a chamber, where the gear teeth extend from the second end of the cone wall;
   a dam that extends radially inward from the interior surface and is axially disposed between the first end of the cone wall and the gear teeth; and
   at least one aperture formed in the cone wall to allow fluid on the interior surface to exit the chamber,
   wherein the at least one aperture is located a first distance from the gear teeth along an axial length of the gear and the dam is located a second distance from the gear teeth along the axial length of the gear, and wherein the first distance is greater than the second distance, and
   wherein the dam is configured to interrupt a flow of fluid along the interior surface in a direction from the first end towards the gear teeth and the at least one aperture is configured to direct at least a portion of the interrupted flow of fluid away from the gear teeth.

2. The gear of claim 1, wherein the dam is a full hoop structure.

3. The gear of claim 1, wherein at least one of the cone wall or the dam is made of a metal or a metal alloy.

4. The gear of claim 1, wherein the gear is one of a bevel gear, a bull gear, or a spur gear.

5. An engine comprising:
   a bull gear that includes first gear teeth; and
   a bevel gear that includes second gear teeth coupled to the first gear teeth, the bevel gear including:
   a cone wall disposed about an axis and comprising a first end and a second end opposite the first end, the cone wall further comprising an interior surface extending between the first and second ends, a radial distance between the interior surface and the axis increasing from the first end to the second end, the radial distance between the axis and the interior surface of the cone wall defining a chamber, where the gear teeth extend from the second end of the cone wall;

a dam that extends radially inward from the interior surface and is axially disposed between the first end of the cone wall and the second gear teeth; and at least one aperture formed in the cone wall to allow fluid on the interior surface to exit the chamber, wherein the at least one aperture is located a first distance from the second gear teeth along an axial length of the bevel gear and the dam is located a second distance from the second gear teeth along the axial length of the bevel gear, and wherein the first distance is greater than the second distance, and wherein the dam is configured to interrupt a flow of fluid along the interior surface in a direction from the first end towards the gear teeth and the at least one aperture is configured to direct at least a portion of the interrupted flow of fluid away from the gear teeth.

6. The engine of claim 5, wherein the at least one aperture conveys a fluid that impinges upon the cone wall subsequent to the fluid contacting the dam.

7. The engine of claim 6, wherein the fluid includes oil.

8. The engine of claim 6, further comprising:
a baffle that redirects the fluid that exits the at least one aperture in a predetermined direction.

9. The engine of claim 8, wherein the predetermined direction is based on at least one of an orientation of the at least one aperture or an orientation of the baffle.

10. The engine of claim 6, further comprising:
at least one conduit that captures the fluid that exits the at least one aperture.

11. The engine of claim 10, wherein the at least one conduit routes the fluid to at least one of a tank, a sump, or a scavenge line.

12. The engine of claim 5, wherein the at least one aperture includes a plurality of apertures formed in the cone wall.

13. The engine of claim 5, wherein the dam is a full hoop structure.

14. The gear of claim 1, wherein the interior surface of the cone wall faces the axis from the first end to the second end of the cone wall.

15. The engine of claim 5, wherein the interior surface of the cone wall faces the axis from the first end to the second end of the cone wall.

* * * * *